Patented Dec. 20, 1938

2,140,921

UNITED STATES PATENT OFFICE 2,140,921

MANUFACTURE OF SOLUTIONS OF A POLYMERIZED VINYL COMPOUND

Herbert Rein, Leipzig, Germany, assignor to I. G. Farbenindustrie Aktiengesellschaft, Frankfort-on-the-Main, Germany No Drawing. Application December 6, 1935, Serial No. 53,161. In Germany December 8, 1934.

11 Claims. (Cl. 134—26)

This invention relates to a process of manufacturing a solution of a polymerized vinyl compound.

It has been proposed in making solutions of polymerized vinyl compounds that quaternary ammonium bases liquefied by heat should be used as solvent.

It is an object of the present invention to provide a new and improved process for producing solutions of polymerized vinyl compounds.

A further object resides in the formation of new solutions of polymerized vinyl compounds which may be employed for spinning and casting.

Further objects will become apparent as the following description proceeds.

According to the present invention it has been found that a solution of a polymerized vinyl compound is obtainable by the use of a concentrated metal salt solution. All those metal salts have been discovered to be suitable, which are capable of forming a compound of addition with the polymerized vinyl compounds. These metal salts are, primarily, hydrated salts, that is to say, salts which have strongly hydrated ions, i. e. ions which are surrounded by a big water envelope. Such hydrated salts are, for instance, the chlorides, bromides, iodides, thiocyanates, perchlorates and nitrates. Dissolution occurs already when working at room temperature and depends on the degree of polymerization, so that the less highly polymeric compounds are dissolved already at a lower temperature. The upper limit of temperature at which the process can be carried out, is fixed by the decomposition of the polymerized vinyl compounds. The reaction is preferably carried out at a temperature of about 80 to 100° C. As polymerized vinyl compounds there are suitable not only the polymerization products of a unitary compound, but also the polymerization products of a mixture of vinyl compounds, and furthermore the condensation products of polymerized vinyl compounds or polymerized mixtures of vinyl compounds with an aldehyde, for instance, with formaldehyde, acetaldehyde, or butyraldehyde.

The solutions of polymerized vinyl compounds thus made may contain also in solution a polymeric carbohydrate, for instance cellulose, a cellulose ester or a cellulose ether, and/or a polypeptide, such as fibroin. Obviously, the solution may also contain other matter, for instance softeners, pigments, filling agents or the like. The solutions are applicable for making threads, films and other shaped products, for which purpose the polymerized vinyl compound may be reprecipitated by means of water, dilute salt solutions, acids or the like in known manner.

The following examples illustrate the invention:

Example 1.—60 grams of polyacrilic acid nitrile are introduced into a solution of 1500 grams of lithium bromide in 750 cc. of water and are stirred therein at 100 to 115° C. until dissolved. There is produced a viscous solution which can be ejected from jets or slits to form threads or films.

Example 2.—4 parts of polyacrilic acid nitrile are introduced into a solution of 100 parts of crystallized zinc chloride in 25 parts of water and dissolved therein by stirring the liquid at about 100° C. The solution is yellowish and viscous; it is advantageously worked up directly because gradually the saponification of the nitrile occurs.

Example 3.—5 parts of acrylic acid nitrile are added to a mixture of 100 parts of crystallized sodium thiocyanate in 30 parts of water, and the whole is heated to 100–110° C. while stirring. There is obtained a yellowish, clear solution from which the polyacrylic acid nitrile can be precipitated by means of water or acid.

Example 4.—Into a solution of 150 parts of lithium bromide in 75 parts of water are introduced 5 parts of polyacrylic acid nitrile, 1 part of comminuted hydrated cellulose and 1 part of degummed and comminuted silk waste, and the whole is heated, while stirring, at 100 to 110° C., until dissolution has occurred.

Example 5.—3 parts of polyacrylic acid nitrile are treated with 100 parts of a saturated solution of aluminium perchlorate at about 100 to 110° C. while stirring or kneading until a homogeneous solution is obtained. The further working up is as described in the above examples.

Example 6.—6 parts of the product of reaction between polyvinyl alcohol and formaldehyde dissolved at 100 to 110° C. in a 60 per cent solution of calcium nitrate yield an almost clear, highly viscous solution.

Example 7.—100 grams of a condensation product of polymeric vinylalcohol with formaldehyde are dissolved in 900 grams of a solution of aluminium perchlorate of about 60 per cent. strength, at 100 to 110° C. while kneading. There is obtained a clear viscous solution, from which threads or films can be made.

Example 8.—50 grams of a condensation product from polymeric vinylalcohol and butyraldehyde are kneaded at a temperature of 100 to 110° C. together with 950 grams of a solution of calcium sulphocyanide of 50 per cent. strength until dissolution has occurred.

*Example 9.*—50 grams of a mixed polymerization product prepared from a mixture of acrylic acid and acrylic acid methyl-ester, in the proportion of 2:1, are dissolved in a concentrated cadmium bromide solution by vigorous kneading at a temperature of 100 to 110° C. The solution may be used for casting films, water being used as the precipitating agent.

*Example 10.*—60 grams of a mixed polymerization product, prepared from a mixture of equal quantities of vinyl chloride and acrylic acid nitrile, are kneaded at a temperature of 100 to 110° C. together with 940 grams of a saturated solution of calcium sulphocyanide. There is obtained a viscous solution which can be drawn into threads.

*Example 11.*—50 grams of a mixed polymerization product from 45 parts of acrylic acid nitrile and 55 parts of acrylic acid methyl-ester, are kneaded at a temperature of 100 to 110° C. with 950 grams of a solution of calcium perchlorate of 65 per cent. strength. Within a few hours a clear viscous solution is obtained.

What I claim is:

1. A process of producing a solution of polyacrylic acid nitrile, which comprises dissolving acrylic acid nitrile in a concentrated solution of sodium thiocyanate at a temperature of about 100 to 110° C. while stirring.

2. A process of producing a solution of a condensation product of polymeric vinylalcohol with formaldehyde, which comprises dissolving the condensation product of polymeric vinylalcohol with formaldehyde in a saturated solution of aluminium perchlorate at a temperature of about 100 to 110° C. while stirring.

3. A process of producing a solution of polyacrylic acid nitrile, which comprises dissolving a mixture of polyacrylic acid nitrile, cellulose hydrate and silk waste in a concentrated solution of lithium bromide at about 100 to 110° C. while stirring.

4. A solution of polyacrylic acid nitrile in a concentrated solution of sodium thiocyanate.

5. A solution of a condensation product of polymeric vinyl alcohol and formaldehyde in a concentrated solution of aluminium perchlorate.

6. A solution of polyacrylic acid nitrile, cellulose hydrate and fibroin in a concentrated solution of lithium bromide.

7. A process of producing a solution of a polyvinyl resin selected from the group consisting of polyacrylic acid nitrile, polyvinyl acetals, interpolymers derived from acrylic acid nitrile and another vinyl compound, and interpolymers derived from acrylic acid and another vinyl compound, which process comprises dissolving said polyvinyl resin in a concentrated aqueous solution of a highly water-soluble hydrated metal salt selected from the group consisting of chlorides, bromides, iodides, thiocyanates, perchlorates and nitrates.

8. A process of producing a solution of a polyvinyl resin selected from the group consisting of polyacrylic acid nitrile, polyvinyl acetals, interpolymers derived from acrylic acid nitrile and another vinyl compound, and interpolymers derived from acrylic acid and another vinyl compound, which process comprises dissolving said polyvinyl resin in a concentrated aqueous solution of a highly water-soluble hydrated metal salt selected from the group consisting of chlorides, bromides, iodides, thiocyanates, perchlorates and nitrates, at a temperature between 50 and 100° C.

9. A process of producing a solution comprising a polyvinyl resin, a carbohydrate and polypeptide, said polyvinyl resin being selected from the group consisting of polyacrylic acid nitrile, polyvinyl acetals, interpolymers derived from acrylic acid nitrile and another vinyl compound, and interpolymers derived from acrylic acid and another vinyl compound, which process comprises dissolving said polyvinyl resin together with said carbohydrate and said polypeptide in a concentrated aqueous solution of a highly water-soluble hydrated metal salt selected from the group consisting of chlorides, bromides, iodides, thiocyanates, perchlorates and nitrates, at a temperature between 50 and 100° C.

10. A solution of a polyvinyl resin selected from the group consisting of polyacrylic acid nitrile, polyvinyl acetals, interpolymers derived from acrylic acid nitrile and another vinyl compound, and interpolymers derived from acrylic acid and another vinyl compound, in a concentrated aqueous solution of a highly water-soluble hydrated metal salt selected from the group consisting of chlorides, bromides, iodides, thiocyanates, perchlorates and nitrates.

11. A solution comprising a polyvinyl resin, a carbohydrate and polypeptide, said polyvinyl resin being a member of the group of polymers consisting of polyacrylic acid nitrile, polyvinyl acetals, interpolymers derived from acrylic acid nitrile and another vinyl compound, and interpolymers derived from acrylic acid and another vinyl compound, in a concentrated aqueous solution of a highly water-soluble hydrated metal salt selected from the group consisting of chlorides, bromides, iodides, thiocyanates, perchlorates and nitrates.

HERBERT REIN.